(12) United States Patent
Courter

(10) Patent No.: US 7,516,557 B2
(45) Date of Patent: Apr. 14, 2009

(54) SOLAR SITE SELECTION APPARATUS AND METHOD

(76) Inventor: Anthony Courter, 3953 Marsh Creek Rd., Linden, TN (US) 37096

( * ) Notice: Subject to any disclaimer, the term of this patent is extended or adjusted under 35 U.S.C. 154(b) by 467 days.

(21) Appl. No.: 11/384,180

(22) Filed: Mar. 17, 2006

(65) Prior Publication Data

US 2007/0214665 A1 Sep. 20, 2007

(51) Int. Cl.
*G04B 49/02* (2006.01)

(52) U.S. Cl. ........................ 33/270; 33/1 DD

(58) Field of Classification Search .......... 33/268–271, 33/1 DD, 1 CC, 1 H, 1 G
See application file for complete search history.

(56) References Cited

U.S. PATENT DOCUMENTS

| 4,177,566 | A  | * | 12/1979 | Haines ...................... 33/1 DD |
| 4,302,088 | A  | * | 11/1981 | Vezie .......................... 396/316 |
| 5,186,630 | A  | * | 2/1993 | Tien ............................ 434/149 |
| 5,425,178 | A  | * | 6/1995 | Steele ........................ 33/271 |
| 6,338,027 | B1 | * | 1/2002 | Fulton ....................... 702/127 |
| 6,810,594 | B2 | * | 11/2004 | Lucarini et al. .............. 33/270 |
| 7,106,660 | B2 | * | 9/2006 | Jenkins ........................ 33/270 |
| 2004/0078988 | A1 | * | 4/2004 | Lucarini et al. .............. 33/270 |
| 2005/0230598 | A1 | * | 10/2005 | Hopkins et al. ........... 250/208.1 |
| 2007/0150198 | A1 |  | 6/2007 | MacDonald |

OTHER PUBLICATIONS

SolarPathfinder; www.solarpathfinder.com; Fast Accurage Solar Site Analysis; Products, Main Products Page; How The Pathfinder Works; Replacement Parts: Sunpath Diagram; Products, Angle Estimators; Products, Total Sections; Products, Single Parts, Replacement Parts; How The Pathfinder Works, Magnetic Declination; Solar Industries, Obtaining Solar Radiation Data; Contact Information. (2005).
"SunEye", www.solmetric.com, copyright 2008, 3 pages.

* cited by examiner

*Primary Examiner*—Yaritza Guadalupe-McCall
(74) *Attorney, Agent, or Firm*—Baker Donelsons Bearman Caldwell & Berkowitz, PC

(57) ABSTRACT

An apparatus receives a digital image of a sun trace chart having time gradient lines and a sun trace extent line for a site. A selector defines on a display points along the solar trace extent line to define a solar opportunity region. An adjuster adjusts the digital image based on the magnetic declination of the site. The solar exposure potential is determined based on the proportion of solar trace extent lines within solar opportunity region and potential solar exposure. Site adjustments to increase solar energy potential are facilitated. A method of evaluating a site for solar energy potential is disclosed. A solar exposure device for recording and analyzing a solar trace is disclosed.

19 Claims, 4 Drawing Sheets

SOLAR SITE SELECTION APPARATUS AND METHOD

TECHNICAL FIELD

The present invention relates to solar site evaluation apparatus and methods. More particularly, the present invention relates to apparatus and methods that facilitate selection and adjustment of sites for reception of solar energy.

BACKGROUND OF THE INVENTION

Energy demands are increasing not only in the United States, but worldwide as well. Energy in the form of electricity and petroleum including fuels such as gasoline and diesel, natural gas, and heating oil, are becoming more expensive. This is in part due to increasing demand throughout the world notwithstanding efforts to conserve. In addition, sources of energy products are becoming more difficult to obtain and require enhanced technology for recovering. Refineries presently operate at close to capacity levels. Coal plays an important role; however, coal also has intense labor requirements and necessary post burning filtering and cleaning of exhaust and water. Nuclear electrical generation plants are being viewed again favorably, and a significant percentage of electrical energy is generated using such plants worldwide.

In addition to conventional sources of electrical energy, other alternative generation systems are available. These include hydroelectric, oceanic involving thermal and mechanical transfers of energy, wind power, and solar. These alternate forms of electrical generation presently tend to be more expensive per kilowatt hour than more conventional sources. However, as demand for energy increases, alternative energy sources become increasingly attractive for environmental and cost reasons. Further, as costs for equipment, installation, and maintenance of these alternative systems decrease (or increases moderate), as well as incentives from manufacturers and governments for such alternative sources, these alternative sources become more attractive for use.

The effectiveness of solar systems for electrical generation or heating of water depends upon the particular site for which solar energy generation is to be utilized. Visual assessments and manual estimates provide some indication as to the desirability of a site for solar energy generation. Further, a tool has been developed using a reflector dome and astronomical grid to record a sun track relative to a particular site. The sun track is evaluated for determining annual solar capacity for evaluating the opportunity and economics of a particular site for solar energy.

This analysis device positions a template having a latitude band for a specific geographic location under a transparent dome. The device is positioned where the solar energy capacity is to be determined for a solar collector. The surrounding area reflects onto the template. The template includes grid lines for time of day and time of year. A trace is made of the curve of the reflection on the paper template to render a trace for the particular site.

The lines on the template are specific to the latitude band. Columns represent half hour increments and rows represent months of year. To determine the amount of solar exposure, the unshaded half hour sections are summarized. A percent solar exposure is determined. The site percent value is converted to kilowatt hours per square meter per day. This conversion is based on comparing the site solar capacity with data values of a selected comparable unobstructed site. The National Renewable Energy Lab provides solar radiation energy level data for various weather stations as recorded over an extended number of years. The website on the World Wide Web http://rredc.nrel.gov/solar/codes_algs/PVWATTS/version1 provides access to this data as well as analysis software.

While this approach reaches a solution as to potential solar opportunity, the solar site analysis tools experience drawbacks to its use. The device and analysis is subject to error and is time consuming to use. The analysis lack precision and flexibility of use, particularly for evaluating a site and making recommendations for changes in order to enhance the solar profile of the site. Accordingly, there is a need in the art for apparatus and methods that facilitate selection, evaluation, and modification of sites for reception of solar energy. It is to such that the present invention is directed.

SUMMARY

The present invention meets the needs in the art by providing an apparatus for facilitating the adjustment of a site for solar exposure potential in which a digital image of a sun trace extent line produced on a solar dome positioned at a site communicates to an analyzer. A display displays the digital image with a sun trace template for the site. A calibrator locates a first reference point and a second reference point that are fixed relative to an orientation of the digital image and rotates the digital image to align with a predetermined orientation for analysis. A selector defines a plurality of points along the sun trace extent line to form a solar opportunity region relative to the digital image of the site. An adjuster adjusts the digital image based on the magnetic declination of the site. Determination means determines a solar exposure potential for the site in view of the selected points from the sun trace template at the site based on the proportion of a plurality of time gradient lines within the solar opportunity region of the site and a potential solar exposure value for an unobstructed site. The resulting exposure value for the site facilitates adjustments to the site to increase solar energy potential for the site.

In another aspect, the present invention provides a method of evaluating selected solar sites, comprising the steps of:

(a) providing to an analyzer a digital image of a sun trace extent line produced on a solar dome positioned at a site;

(b) orienting the digital image relative to a predetermined orientation to align with a sun trace template for the site based on a pair of reference point fixed relative to the digital image;

(c) selecting from a display of the oriented digital image a plurality of points along the sun trace extent line to define a solar opportunity region;

(d) adjusting the digital image for magnetic declination for the site;

(e) analyzing the adjusted oriented digital image based on the relative proportion of the solar trace template within the solar opportunity region and a potential solar exposure value for an unobstructed site to determine the periodic solar exposure for the site.; and (f) generating a report of the periodic solar exposure, to facilitate adjusting selectively the site to change a potential for solar exposure.

In another aspect, the present invention provides a solar exposure device for obtaining a solar trace for determining solar exposure capacity of a site, comprising a housing having a compass for determining the positional alignment of the housing and an image receiver configured for receiving an image of a solar trace at a site. Position data associated with the orientation of the platform as determined by the compass and a digital image of the solar trace received by the image receiver communicate to an electronic analyzer to determine solar opportunity capacity for the site, wherein the electronic analyzer communicates with a supply of digital representations of solar path templates each reflecting daylight hour gradient lines and month gradients for analyzing solar exposure capacity for the site, each of the solar path templates corresponding to a particular latitude.

Objects, features and advantages of the present invention will become apparent upon a reading of the following detailed description in conjunction with the drawings and the appended claims.

DETAILED DESCRIPTION

Figure 1:
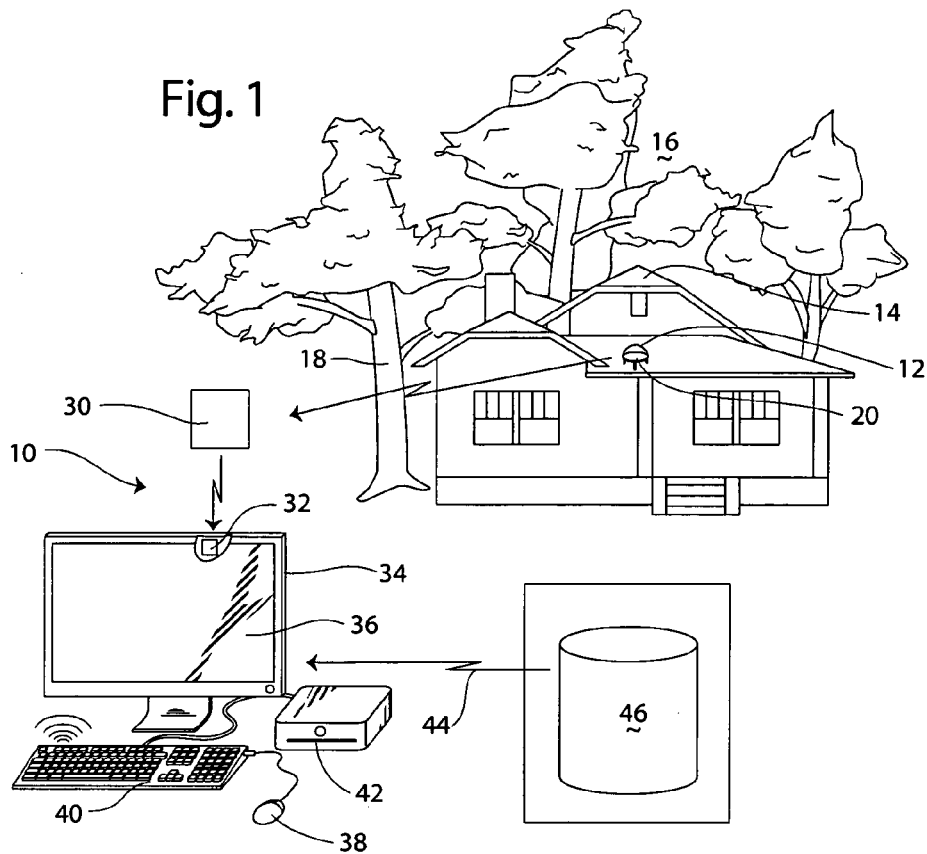
FIG. 1 is a schematic illustration of the apparatus for site evaluation as to solar capacity, according to the present invention.

Referring now in more detail to the drawings, in which like reference numerals indicate like parts, FIG. 1 illustrates in schematic view a solar analysis system 10 according to the present invention. The system 10 includes a solar dome 12 that is positioned at a site such as a building or house 14. The site 14 includes a structure on which the solar collection panels (whether photovoltaic, water tube solar collection device, or the like) mount. The site includes a surrounding area generally 16 which includes a horizon and obstructions such as buildings, trees, and other geophysical features. The orientation of the building 14 relative to the area 16 obstructions affect the solar capacity of the site, which capacity is to be analyzed using the present invention. The solar dome 12 receives a sun path template 20 for recording a solar trace at the site.

Figure 2:
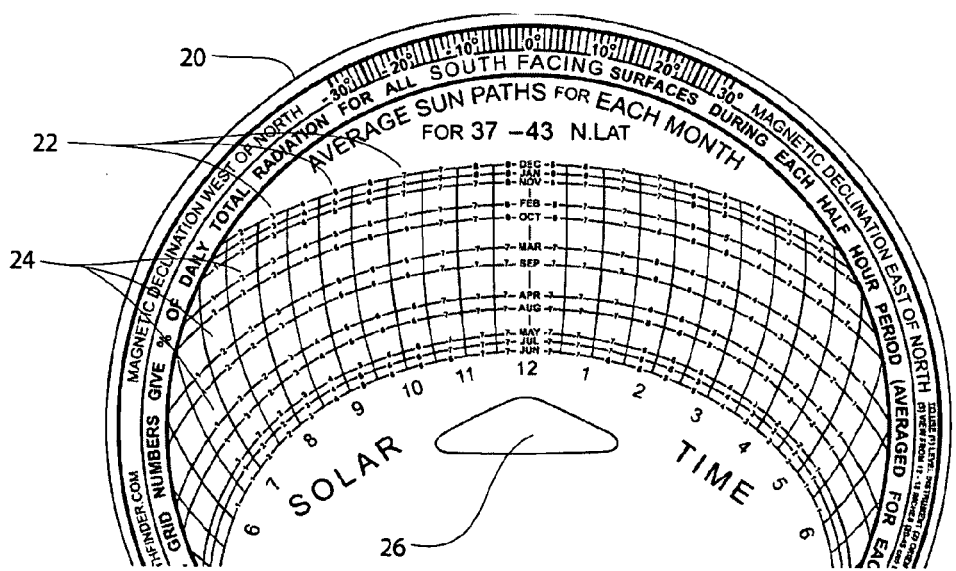
FIG. 2 illustrates a sun path trace diagram in accordance with the present invention.

With reference to FIG. 2, the sun path solar template 20 includes a plurality of columns 22 representing half hour increments of sunlight through the day. A plurality of rows 24 or time gradient lines represent the months of the year at the particular time. The solar template 20 includes an alignment opening 26 for positioning the template relative to the solar dome 12. The solar dome includes a projection that matingly engages the opening 26.

Returning to FIG. 1, the solar evaluation system 10 receives a digital image 30 of the solar template 20. The digital image 30 communicates to an analyzer 32. In the illustrated embodiment, the analyzer 32 is incorporated within a computer 34 containing a display screen 36 for presentation of information. The computer 34 further includes conventional input devices such as a mouse 38, keyboard 40 and a data card interface device 42. The computer 34 communicates with a database 46 containing solar radiation data useful in the analysis of the solar capacity of the site 14. Such data is published by the National Renewable Energy Laboratory (www.nrel.gov). The database can be contained on disk storage device local to the computer 34 or contained on a remote disk storage device accessed by a communications link, such as through the World Wide Web.

Figure 3:
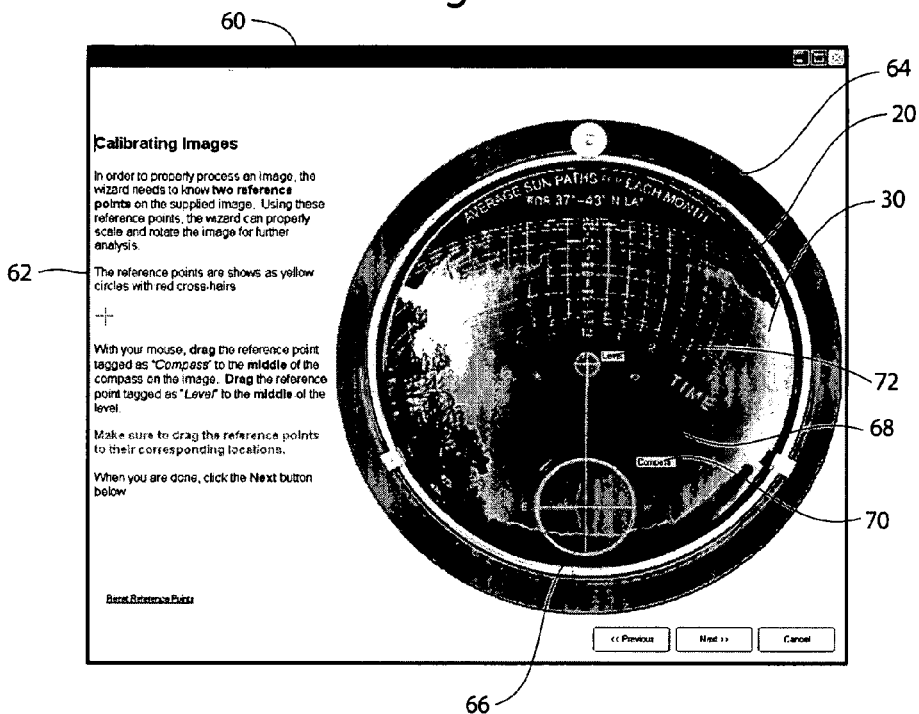
FIG. 3 illustrates the digital image of the sun path trace displayed on a monitor for calibration and analysis.

FIG. 3 illustrates a calibration screen 60 displayed on the screen 36 by the analyzer 32. The calibration screen provides instructions generally 62 and a display 64 of the digital image 30. The display 64 includes an image of the solar template 20 as positioned in the solar dome 12. The display 64 includes an image of a compass 66 and an image of a level 68 that mount to the solar dome. The calibration screen 60 includes a compass reference point 70 and a level of reference point 72.

Figure 4:
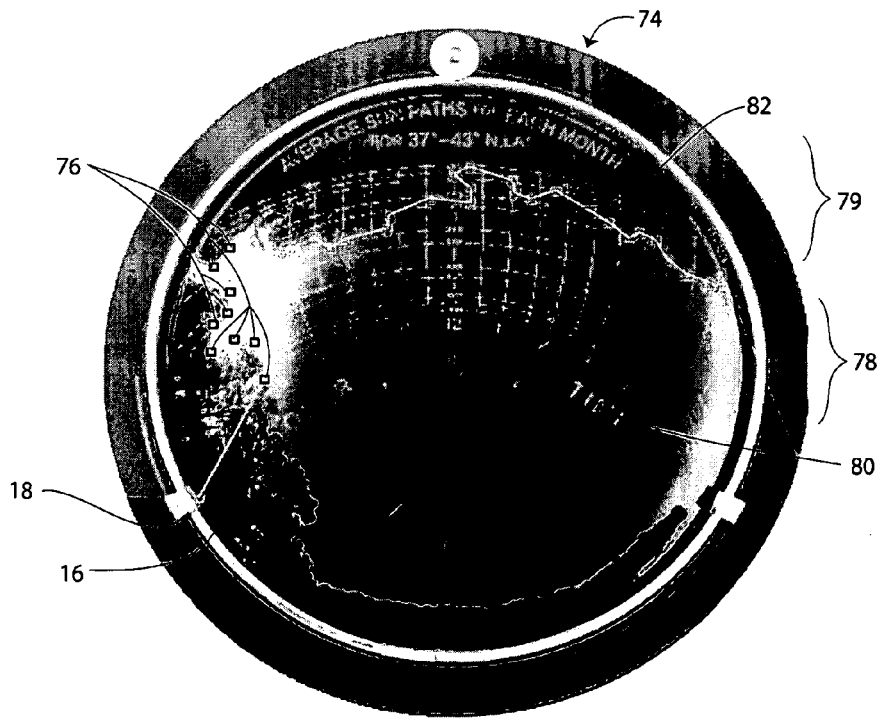
FIG. 4 illustrates communicating the sun path trace to the analyzer according to the present invention.

FIG. 4 illustrates the digital image for tracing 74 presented on the display screen 36. The image trace 74 includes an image of the area 16 surrounding the site 12, including the various obstructions such as trees 18. Discrete data points 76 are selectively marked on the image trace 74 along the solar trace extent line 82 that is a demarcation line of the obstructions 18 shown on the image trace 74. The data points 76 define a solar opportunity region 78 between a base line 80 and the solar trace extent line 82, and an obstructed or shaded region 79. The solar opportunity region 78 reflects the total potential solar capacity of the site 14. The more data points 76 that are identified provide a more accurate representation of the sun trace extent line 82 for the site 12.

Figure 5:
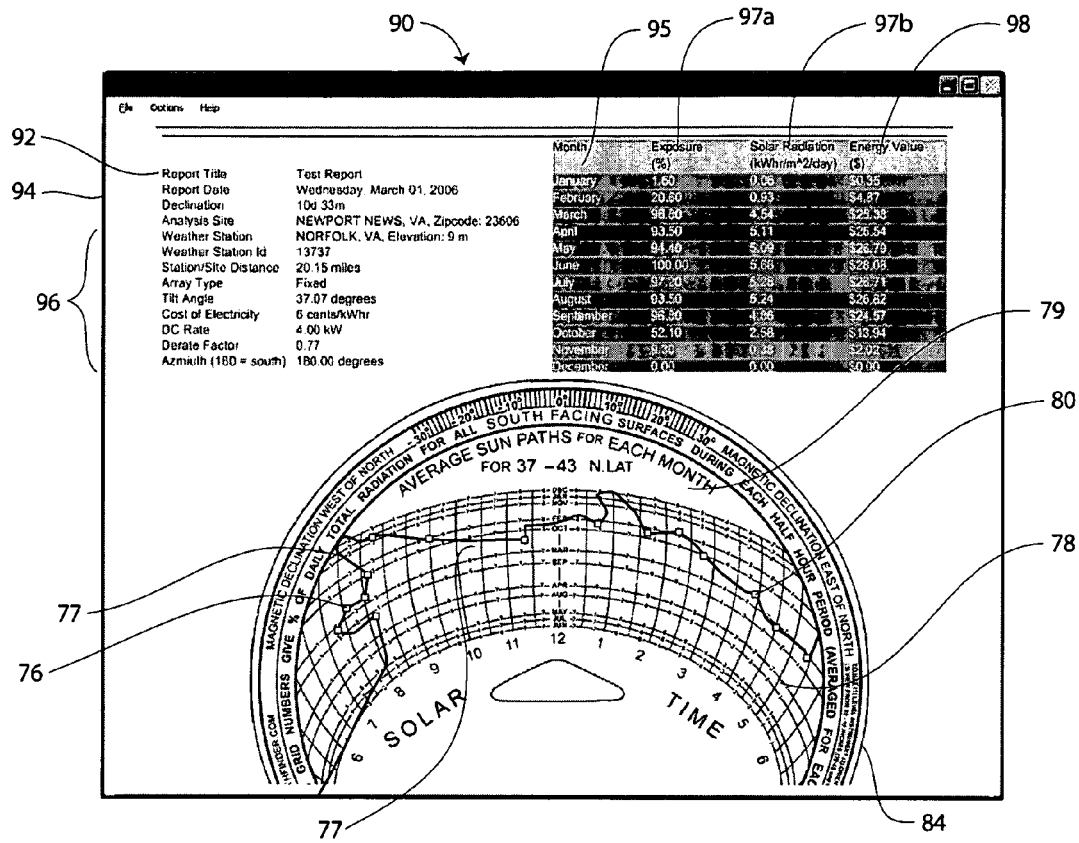
FIG. 5 illustrates an analyzed sun trace with an analysis report in accordance with the present invention.

FIG. 5 illustrates an analyzed sun trace diagram 84 presented on the display screen 36. The data points 76 have been connected in sequence to define the solar opportunity region 78. The solar opportunity region 78 is presented for display purposes in one shading while the portion exterior to the region 78 (i.e., the shaded or obstructed region 79) is shown in a contrasting display.

FIG. 5 further illustrates a solar analysis data report 90. The report 90 includes the magnetic declination 92 associated with the site 12, an identifier 94 such as a zip code, identifying the location of the site 14, and the site analysis information 96. The report 90 includes the months 95, the solar exposure capacity for the site as a percentage exposure 97a and solar radiation 97b for the site, and the energy value 98 for the site. Solar capacity ranges between 0 and 100. Higher values of solar capacity reflect an increased suitability of the site for solar energy generation. Based upon this evaluation, adjustments can be made to the site 14 and area 16 in order to adjust the solar exposure capacity.

Figure 6:
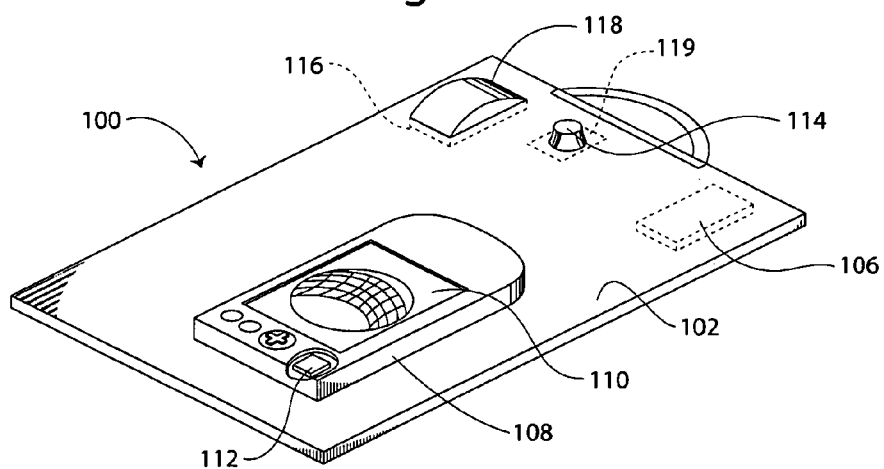
FIG. 6 illustrates in perspective view a solar exposure device according to the present invention for evaluation as to solar capacity of a site.

FIG. 6 illustrates in perspective view a solar exposure device 100 for use in evaluation of the solar capacity of the site. The device 100 includes a housing 102, such as a clipboard, tablet, container, or other platform, that enables carrying and holding the device 100 at the site. The housing 102 includes a compass 106 for determining the orientation of the platform relative to a predetermined mark line, such as line extending along a north-south line. The compass 106 can be conventional, or as illustrated, digital that communicates with an electronic analyzer 108. The electronic analyzer 108 is a portable computer or microprocessor device, including a personal data device (PDA), laptop, tablet computer, desktop, dedicated processor device, embedded computer device system, or other computer-based storage and analysis device. The electronic analyzer 108 is configured for receiving and storing information via a signal channel, such as a wireless or direct wired connection. The electronic analyzer 108 includes a display 110 and a disk storage device 112. The housing 102 holds an image receiver 114. The image receiver 114 includes a CMOS device, a digital camera, an analog device (CCD or film image device from which a digital image can be obtained), or other suitable image recording device, with a fisheye or wide angle lens for imaging upwardly so as to record the obstructions around the site under evaluation.

A level (not illustrated) can mount on the housing 102 to guide the user in positioning the platform substantially horizontal relative to a surface of the site to be evaluated for solar exposure capacity. The digital compass 106 however in one embodiment includes a conventional 3-axis mount device, to determine the orientation including tilt relative to the horizon.

While the location of the site as to latitude and longitude can be estimated by use of a postal code as discussed below, an alternate embodiment includes a global positioning sensor 116 having a receiver antenna 118 for receiving signals from satellites with the sensor configured for determining a latitude and longitude associated with the site. Global positioning technology is conventional and no further description of such systems for determining latitude and longitude is made.

For an electronic image receiver 114, the signal representative of the image communicates wirelessly, or by a cable connector, from a controller 119 to the electronic analyzer 108. Further, the electronic analyzer 108 interfaces wirelessly or by cable with the global positioning sensor for receiving a digital signal of the determined latitude and longitude of the site.

In this device 100, the analyzer 108 superimposes the image of the shadowing of the surrounding area 16 showing the solar extent line over a sun path template appropriate for the particular latitude. The display 110 shows the image being received through the image receiver 114. The sun path templates are held in disk storage 112 as digital images of the sun path template for particular latitudes.

Figure 7:
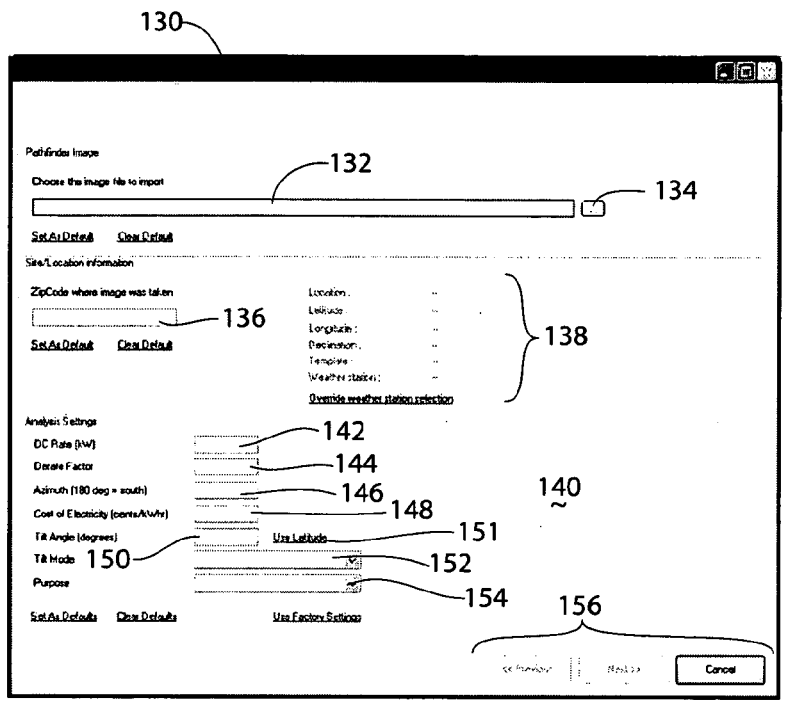
FIG. 7 illustrates a screen image of system for analyzing solar capacity for a site.

FIG. 7 illustrates a screen image 130 of a computer system for analyzing solar capacity for a site. In an embodiment that receives a digital image of the sun path template together with the solar extent line (see FIG. 1), the screen image 130 includes a file field 132 for entry of the name of the file containing the image and site data for analysis. A selection button 134 allows the user to browse though the disk drive of the computer system to locate the particular site file. The site file is constructed during a step of importing the digital image and the site data and storing the data in a file on a mass storage device. In the embodiment illustrated in FIG. 6 having the dedicated imaging device 114, such file selection occurs automatically as the image is sent to the analyzer 108 automatically for storage and analysis.

A site location field 136 permits associating the site with a particular postal code. The screen displays location information about the site generally 138. In the embodiment using the global positioning system, this location information is determined upon receipt of the determined latitude and longitude position.

Variables for site analysis are entered through buttons in the analysis window 140. A DC Rate field 142 allows entry of the rating of the particular solar panel device to be installed at the site. The Derate Factor field 144 enters the factor to be used when converting from direct current to alternating current. The Azimuth field 146 provides in degrees the difference in facing orientation of the solar panel at the site relative to due South. The Cost of Electricity field 148 allows entry of the energy costs for cost/benefit analysis. The Tilt Angle field 150 enters the angle at which the solar panel at the site is to be mounted. Alternatively, a Use Latitude button 151 enters the latitude for the Tilt Angle. The Tilt Mode field 152 allows selecting whether the solar panel to be installed is fixed installation, has 1-axis rotation, or 2-axis rotation, for moving the solar panel to track the passage of the sun during the day. The Purpose field 154 indicates whether the analysis is for solar energy generation or for ecological evaluation purposes. For a given latitude, there are separate templates for ecological and typical solar energy use. Control buttons generally 156 allow the user to operate the solar analysis system for analysis of the site.

With reference to FIG. 1, the solar analysis system 10 operates to provide estimates of solar energy capacity for the site 14 and facilitates site adjustments to increase the opportunity for solar energy generation at the site. The solar dome 12 is positioned on the site such as on a roof where solar collection equipment is to be placed. The sun path solar template 20 is positioned in the solar dome using the level and mating opening in the template to align the template. The solar dome 12 is moved in order to align a chart line for 12 noon with magnetic north. The solar dome 12 includes a compass for aligning the orientation of the dome.

With reference to FIG. 2, the surrounding area 16 reflects through the dome onto the sun path solar template 20, giving a panoramic view. Trees, buildings, or other obstructions generally 18 to the sun are visible as reflections on the surface of the dome and cast as a shadow onto the template 20. A digital camera or other imaging device is operated to create the digital image 30 of the template 20 with the area 16 shadings on the template 20 for the site. The image is photographed centrally along a line extending substantially perpendicular from the template (approximately within about 5 degrees of perpendicular). The digital image 30 is transferred conventionally to the computer 34 and stored in an image database. The digital image is associated with the zip code of the site, or other geographic indicator of the location of the site.

An alternate embodiment includes a database of the various templates 20 as binary resources. Given a postal code or the latitude and longitude of the site, an appropriate solar path template can be obtained from the database. This embodiment accordingly does not require use of the template 20 when imaging the solar extent line.

With reference to FIG. 3, the digital image 30 is presented on the display screen 36 for calibration. The compass reference point 70 is located and marked using the mouse 38 or other point identifying input device. This is accomplished by clicking on the compass relative point 70 and dragging the point to the center of the compass on the display. The level of reference point 72 is similarly located and marked with a "click and drag" operation. These two points are fixed relative to the solar dome 12 and provide the angular orientation of the digital image of the sun trace template 20 for analysis of the site. An alternate embodiment however bases the solar trace using the angle of orientation of the mark line relative to magnetic north. The analyzer uses this information to adjustment to the digital image by rotating the image to a predetermined orientation to align with the sun trace template 20 prior to evaluating the solar capacity of the site.

Further, the reference points permit comparisons between two distinct images of the site. The level and compass points remain spaced apart to each other relative to rotation for magnetic declination. The digital image of the template 20 has a pixel distance between the two points. Because the pixel locations can be expressed as (x,y) ordered pairs, the distance between the two points can be determined as a reference distance. Given two distinct images, the ratio of the reference distances can be used to determine size relationships for comparisons. Resolution is accommodated by adjusting the template image and the digital image to the same resolution (for example, display screen resolution of 96 pixels).

With reference to FIG. 4, the analyzer 32 receives the plurality of points 76 that define the perimeter of the obstructions 18 as shown in the digital image on the display 36 as the solar extent line 82. The mouse 38 or other point identifying input device is used to enter the data points 76. The data points 76 define the solar extent line 82 between the sun opportunity region 78 and the shade or obstructed region 79. The solar extent line 82 cross over the or intersect the gradient time lines on the template. Generally, the more points 76 that are entered, the more accurate the representation of the solar extent line 82 and thus the more accurate determination of solar capacity.

As shown in FIG. 4, each selected point is identified with a display symbol. Positional adjustments to the points 76 can be made by operating the mouse 38 at one of the points 76, and dragging the point to a new position. The adjustments are made so that the solar extent line 82 tracks closely the demarcation between the regions 78 and 79. The system can configured for entry of additional points between existing data points; for example, holding down the "Ctrl" key on the keyboard 40 while operating the mouse 38 for selecting a new point.

When a satisfactory trace of the solar extent line 82 is entered, the analyzer 32 operates to generate an analyzed solar trace diagram 84, as illustrated in FIG. 5. Using the geographic indicator, the digital image 30 is adjusted for magnetic declination based on latitude and longitude of the site 12. A public domain application www.geomag60.exe provides a table charting latitude and longitude mappings together with the relative magnetic declination associated with such location for a given date. The date of the image is entered manually, or using the embodiment illustrated in FIG. 6, detected by the analyzer accessing the clock available through the operating system. The magnetic declination can be adjusted by rotating either the data points 76 or the template.

The data points 76 are evaluated in the present embodiment as a liner distance and angle from a given reference point (in this embodiment, a central point such as the level point). The display shows the selected data points 76 interlinked by line segments 77 along the extent 80 as well as the sun opportunity region 78 and the shaded region 79. The analyzer 32 integrates the sun opportunity region 78 to develop the solar opportunity for the site based on a monthly value, as shown in FIG. 6.

The data points 76 define the solar opportunity region 78 and the obstruction region 79, such that any half hour segment in the unobstructed region represents solar energy that is available to the site in question. In the embodiments using digital templates, each half hour segment of the time gradient lines is analyzed for both the location of that data point as well as the potential solar exposure for that half hour period. This data is stored as part of the binary image of the application or is accessible from a database. With the location data provided by the consumer, the analyzer selects the appropriate reference template digital image along with its half-hour data points. By "overlaying" the reference template on top of solar opportunity region 78 and the obstruction region 79, the visibility or solar exposure of each half hour segment can be determined. The solar exposure is determined by totaling the relative proportion of a plurality of time gradient lines intersected by the sun trace extent line within the solar opportunity field of the site with a potential solar exposure value for an unobstructed site.

Figure 8:
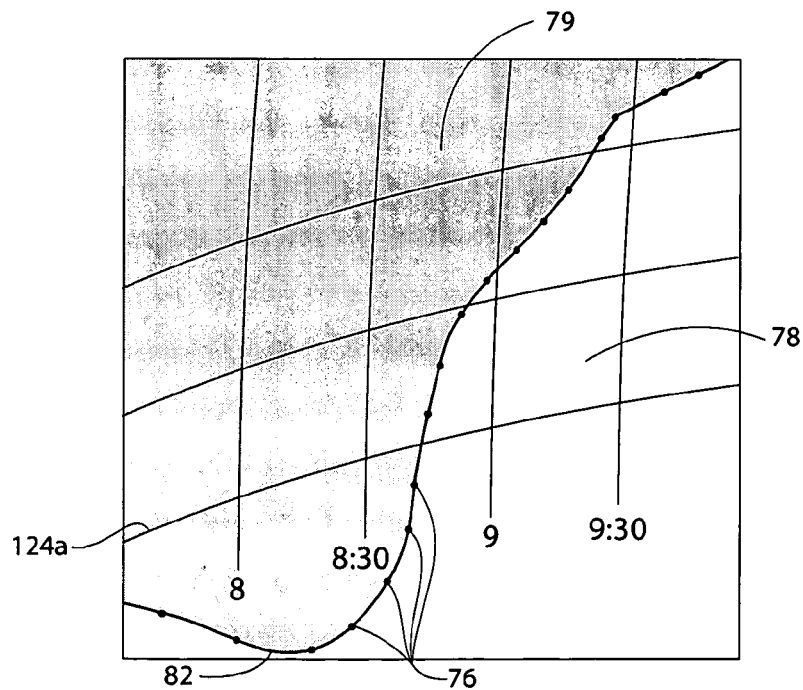
FIG. 8 illustrates a detailed portion of the digital image of the sun path trace displayed on the monitor for analysis.

FIG. 8 illustrates a detailed view of a portion of the solar trace template with the solar extent line 82 defined by a curve though the data points 76 and the solar opportunity region 78 and the shaded or obstructed region 79. The solar exposure is evaluated by considering each month and half hour period on the template and summing the solar exposure within the solar opportunity region 78. To do this, each time period of the time gradient line 24a of the template for a month is defined by a line segment, for example, a line segment between 8 and 8:30 or between 8:30 and 9. The line segment is divided into ten sub-segments. Each sub-segment is evaluated as to whether it is in the solar opportunity region 78 or in the obstructed region 79. The quantity of the sub-segments for the particular time period in the solar opportunity region 78 yields a percentage solar exposure. In FIG. 8, no portion of the time gradient line 24a in the 8 to 8:30 period is in the solar opportunity region 78. Thus, the solar exposure percentage is 0%. In the 8:30 to 9 period, six of the sub-segments are in the region 78, or 60% solar exposure. That. percentage is multiplied by the potential solar exposure for an unobstructed site to yield the solar exposure value for that month and time period. The potential solar exposure can be obtained using data for a selected one of the weather stations included in a database of weather stations having solar exposure records. In the example above, a site with a potential solar exposure value of 4, multiplied by 60% results in a 2.4 solar exposure value. The solar exposure value for each time period and month is determined. The available reports from the analyzer include monthly solar capacity and annual solar capacity as shown in FIG. 5.

With reference to FIG. 6, the solar trace can be readily made by holding the solar device 100 at the site with information for the analysis generated digitally and communicated wireless or by cable to the analyzer 108. The housing 102 is held substantially level, and if the tilt is excessive, the analyzer 108 displays a message on the display 110. Tilting causes the image to be skewed and may lead to loss of obstruction data and extraneous misleading data (i.e., ground) if the tilt is excessive. The image receiver 114 transmits real time images to the analyzer 108. In the embodiment with the digital compass 106 and global positioning sensor 116, signals representative of the determined longitude and latitude as well as the heading and tilt communicate to the analyzer, such as wirelessly by BLUETOOTH transmitter or by a cable such as USB.

When a satisfactory sun trace extent is shown on the display 110, a select button is operated to record the digital image and the compass readings. In this embodiment, the two reference points are not required for input by the user as these reference points are received and evaluated by the analyzer with the compass readings. Thus, no image calibration is required. The digital image however is rotated to align the noon time line for the template to the predetermined orientation of due south. The user then enters the data points 76 as discussed above. In an alternate embodiment, the analyzer automatically locates the solar extent line by the difference between the shaded and unshaded pixels of the image and determines the intersections of the solar path extent line 82 and the time gradients of the template 20. In such operating mode, the analyzer 108 permits the user to accept or reject particular ones of the points 76. The analysis of the solar opportunity field 78 proceeds as discussed above.

While templates 20 preferably are latitude specific, the solar values and the month and hour curves are not consistent over the entire width, but reflect a gradient of values as curves close together. However, in an alternate embodiment, the templates 20 are generated for specific sites, such as by using the latitude as determined by the global positioning system 116. These templates can be paper or digital representations contained within an accessible database or internal to a computer program for analysis.

The present invention accordingly provides a solar capacity evaluator for solar site selection and modification, including various embodiments useful with the present invention, analysis process, and an apparatus reducing the complexity and amount of equipment necessary to conduct solar evaluations for sites. The principles, preferred embodiments, and modes of operation of the present invention have been described in the foregoing specification. The invention is not to be construed as limited to the particular forms disclosed as these are regarded as illustrative rather than restrictive. Moreover, variations and changes may be made by those skilled in the art without departing from the spirit of the invention described in the following claims.

What is claimed is:

1. A method of selecting solar sites, comprising the steps of:
   (a) providing to an analyzer a digital image of a sun trace extent line produced on a solar dome positioned at a site;
   (b) orienting the digital image relative to a predetermined orientation to align with a sun trace template based on a first and second reference point;
   (c) selecting from a display of the oriented digital image a plurality of points along the sun trace extent line to define a solar opportunity region;
   (d) adjusting the digital image for magnetic declination for the site; and
   (e) analyzing the adjusted oriented digital image based on the proportion of the solar trace template within the solar opportunity region and a potential solar exposure value for an unobstructed site to determine the periodic solar exposure for the site; and
   (f) generating a report of the periodic solar exposure facilitating the adjusting selectively the site to change a potential for solar exposure.

2. The method as recited in claim 1, further comprising the step of identifying the geographical location of the site.

3. The method as recited in claim 2, wherein the step of identifying comprises associating the geographical site with a selected postal code.

4. The method as recited in claim 2, wherein the step of identifying comprises associating the geographical site with a particular latitude and longitude.

5. The method as recited in claim 1, wherein the step of providing a digital image comprises positioning a solar dome at the site to produce a sun trace extent thereon and imaging with an image receiver to yield an image for representing as the digital image.

6. The method as recited in claim 1, wherein the step of providing a digital image comprises positioning at the site a solar dome having a sun trace template and obtaining a digital image of the sun trace template having a sun trace extent line thereon.

7. The method as recited in claim 1, wherein the sun trace template includes a plurality of time gradients.

8. An apparatus for facilitating the adjustment of a site for solar exposure potential, comprising:
   an interface that communicates a digital image of a sun trace extent line produced on a solar dome positioned at a site to an analyzer;
   a display that displays the digital image with a sun trace template having a plurality of time gradient lines;
   a calibrator that locates a first reference point and a second reference point fixed relative to the orientation of the digital image and that rotates the digital image to align with a predetermined orientation for analysis;
   an adjuster that adjusting the digital image based on the magnetic declination of the site;
   a selector configured for defining a plurality of points along the solar trace extent line to define a solar opportunity region relative to the digital image; and
   means for determining a solar exposure potential for the site based on the solar opportunity region and a potential solar exposure value for an unobstructed site.

9. The apparatus as recited in claim 8, further comprising means for generating a digital image of a sun trace extent line on a template having a plurality of time gradient lines for a site.

10. A solar exposure device for obtaining a solar trace for determining solar exposure capacity of a site, comprising:
    a housing;
    a compass for determining the positional alignment of the housing;
    an image receiver attached to the housing configured for receiving an image of a solar trace at a site; and
    means for communicating a position data associated with the orientation of the housing as determined by the compass and a digital image of the solar trace received by the image receiver to an electronic analyzer, wherein the electronic analyzer communicates with a supply of digital representations of solar path templates each reflecting daylight hour gradient lines and month gradients for analyzing solar exposure capacity for the site, each of the solar path templates corresponding to a particular lattitude.

11. The solar exposure device as recited in claim 10, wherein the electronic analyzer is a computer device configured for receiving the position data and the digital image and for analyzing the solar capacity of the site.

12. The solar exposure device as recited in claim 10, wherein the means for communicating is a wireless connection to the electronic analyzer.

13. The solar exposure device as recited in claim 10, further comprising a global positioning sensor for determining a latitude and longitude associated with the site and communicating the determined latitude and longitude to the electronic analyzer.

14. The solar exposure device as recited in claim 10, wherein the image receiver is an electronic image device.

15. The solar exposure device as recited in claim 14, wherein the electronic image device is a CMOS device having a fisheye wide angle lens.

16. The solar exposure device as recited in claim 14, wherein the image receiver is a digital camera.

17. The solar exposure device as recited in claim 10, wherein the compass is electronic providing a 3-axis position data of the orientation of the platform.

18. The solar exposure device as recited in claim 10, further comprising level sensor configured for determining an angle of orientation of the platform relative to a surface of the site to be evaluated for solar exposure capacity.

19. The solar exposure device as recited in claim 10, wherein the solar path templates are selectable as to analysis based on solar power capacity and solar ecological capacity.

* * * * *